United States Patent
Morikawa et al.

[19]

[11] Patent Number: 5,881,784
[45] Date of Patent: Mar. 16, 1999

[54] BISCUIT CUTTER

[75] Inventors: Hiroshi Morikawa, Fuchu, Japan; Daniel Alex Chunn, Greenville, S.C.

[73] Assignee: Ryobi North America, Inc., Anderson, S.C.

[21] Appl. No.: 684,173

[22] Filed: Jul. 19, 1996

[51] Int. Cl.$^6$ .................................................. B27M 1/00
[52] U.S. Cl. .................... 144/136.95; 83/522.11; 83/522.17; 144/154.5; 144/371; 409/182
[58] Field of Search .................. 409/175, 178, 409/180, 182, 190; 144/134.1, 136.95, 137, 154.5, 371; 83/522.11, 522.15, 522.16, 522.17, 522.18, 522.19; 30/371, 374, 375, 376, 377, 388, 390, 392

[56] References Cited

U.S. PATENT DOCUMENTS

| | | | |
|---|---|---|---|
| D. 350,468 | 9/1994 | Chunn et al. | 144/136.95 X |
| D. 364,545 | 11/1995 | Chunn et al. | 144/136.95 X |
| 3,576,148 | 4/1971 | Katz . | |
| 4,163,465 | 8/1979 | Strong . | |
| 4,858,661 | 8/1989 | Bosten et al. . | |
| 4,858,662 | 8/1989 | Bosten et al. | 144/136.95 |
| 4,909,680 | 3/1990 | Wolff | 409/180 X |
| 4,913,204 | 4/1990 | Moores et al. . | |
| 4,942,912 | 7/1990 | Gakhar et al. . | |
| 4,971,122 | 11/1990 | Sato et al. | 144/136.95 |
| 5,062,460 | 11/1991 | Deline . | |
| 5,257,654 | 11/1993 | Bean et al. | 144/136.95 |
| 5,273,091 | 12/1993 | Shibata . | |
| 5,291,928 | 3/1994 | Keith, Jr. et al. | 144/371 |

OTHER PUBLICATIONS

"Picking a Plate Joiner", *Fine Woodworking*, Jan.–Feb., 1995, pp. 52–57.

*Primary Examiner*—W. Donald Bray
*Attorney, Agent, or Firm*—Brooks & Kushman P.C.

[57] ABSTRACT

A biscuit cutter is provided for cutting an arcuate slot in the edge surface of a workpiece. The biscuit cutter is made of a base, a drive motor, a rotary cutter blade and an adjustable fence. The base is provided by the first planar surface having an elongated slot through which the rotary cutting blade is positionable when a plurality of extended positions corresponding to a selected one of a plurality of predetermined sized biscuits. The adjustable fence has a second fence surface for engaging the workpiece and has a centerline indicia and a plurality of slot length indicia spaced about the centerline indicia for providing a visual indication to the user of the length of the slot to be formed in the workpiece for each of the plurality of biscuit sizes.

9 Claims, 6 Drawing Sheets

BISCUIT CUTTER

TECHNICAL FIELD

The present invention relates generally to biscuit cutters and more particularly to biscuit cutter fences.

BACKGROUND ART

Biscuit cutters, or plate joiners as they are sometimes referred to, are a relatively commonly used tool for forming alignment slots in boards to be glued together. A biscuit, formed typically of plywood, is used to align a pair of board edges precisely during a gluing operation. Biscuits are used in conjunction with biscuit cutters in applications where dowel pins have historically been used. Biscuits offer a number of significant advantages over dowel pins, the most important of which is ease of alignment when biscuits are used to align board edges in preparation of gluing.

When using a biscuit cutter, the distance from the top planar surface of the workpieces or boards to be joined must be precisely controlled in order to form a flush tabletop or a square 90° corner. The transverse location of the biscuit is typically not critical as is the case with the multiple dowel pins. Therefore, it is very easy to install multiple biscuits along an elongated glued edge joint since there will typically be ample transverse clearance between the arcuate slot cut in the workpiece edge and the biscuit. The thickness of the slot relative to the biscuit width however, is slightly controlled to provide a very snug fit to precisely align the workpiece planar surfaces.

Typically, a user wanting to join two board edges together will align the boards in their intended final orientation and mark a series of pencil lines across the edge joint generally perpendicular to the edge. The boards are then separated and a biscuit cutter is used to cut slots in the board edges a predetermined distance from the planar surface generally aligned with the pencil centerline markings. This is relatively easy to do when the boards are long and the biscuits are located a substantial distance from the board ends.

However, when the boards to be joined are quite narrow or where it is necessary to locate biscuits immediately adjacent the board end, the user must be extremely careful so that the biscuit slot does not break out into the board end causing a cosmetic defect. When making a shallow drawer for example, the drawer may not be much deeper than the biscuit length. Therefore it is important to carefully center the biscuit so that the arcuate slots formed in the drawer rails and panels do not break out.

Moreover, the biscuit itself is not a good indication of slot length because the slot will always be longer than the biscuit. This is due to biscuit slot clearance and the fact that the biscuit is truncated so that its length is significantly less than the length of the elongated slot at the workpiece edge surface.

SUMMARY OF THE INVENTION

For the foregoing reasons a need exists for a biscuit cutter which is easily aligned with the workpiece so that the user knows precisely the length of the elongated slot to be formed in the workpiece.

It is also an object of the present invention to provide a biscuit cutter and an associated fence which provide a visual indication to the user of elongated slot length for each of a plurality of biscuit sizes capable of being formed by the biscuit cutter.

It is further an object of the present invention to provide a biscuit cutter fence which has alignment indicia which is easily viewable on the workpiece planar surface adjacent the workpiece edge in which the arcuate slot is to be formed.

It is again another object of the present invention to provide a biscuit cutter fence having indicia providing a visual indication to the user of the depth of the arcuate slot to be formed on the workpiece.

In carrying out the above objects, the present invention provides a biscuit cutter having four main elements: a base, a drive motor, a rotary cutter blade, and an adjustable fence. The base is provided with a planar first fence surface with an elongated opening extending therethrough for abutting an edge surface of the workpiece to be slotted. A drive motor is supported relative to the base for providing a source of rotary power. A rotary cutter blade is driven by the drive motor about a cutter axis which is parallel to the first fence surface of the base.

The cutter blade is mounted relative to the base adjacent the elongated opening and shiftable along a cutter plane perpendicular to the first fence surface relative the base between a retracted position when the rotary cutter blade is within the base and a plurality of extended positions in which the cutter blade extends or projects through the elongated opening in the base into the edge surface of the workpiece to form an arcuate slot corresponding to a selected one of a plurality of predetermined sized biscuits for receiving a selected one of a plurality of predetermined sized biscuits.

The adjustable fence is affixable relative to the base in various positions. The adjustable has a planar second fence surface for engaging the workpiece planar surface. The adjustable fence is provided with a centerline indicia formed thereon so that a user can align the fence with a slot centerline mark placed on the workpiece planar surface. A plurality of pairs of slot length indicia are spaced about the centerline indicia for providing a visible and visual indication to the user of the length of the slot to be formed in the workpiece for each of the plurality of extended positions of the cutter blade corresponding to a plurality of different biscuit sizes.

An embodiment of the invention is further provided with a plurality of slot depth indicia formed on the adjustable fence at a location spaced from the first fence surface to provide a visual indication to the user of the depth of the slot to be formed at each of a plurality of extended positions of the cutter blade corresponding to a plurality of different predetermined sized biscuits.

In one of the embodiments of the invention provided the adjustable fence is formed of a transparent material enabling the user to view the workpiece through the adjustable fence and further aiding the user in aligning the biscuit cutter to form an arcuate slot in the workpiece. More particularly in aligning the fence relative to the workpiece to be slotted.

The above objects and other objects, features, aspects and embodiments of the present invention are readily apparent from the following detailed description, appended claims and accompanying drawings.

BEST MODES FOR CARRYING OUT THE INVENTION

Figure 1:
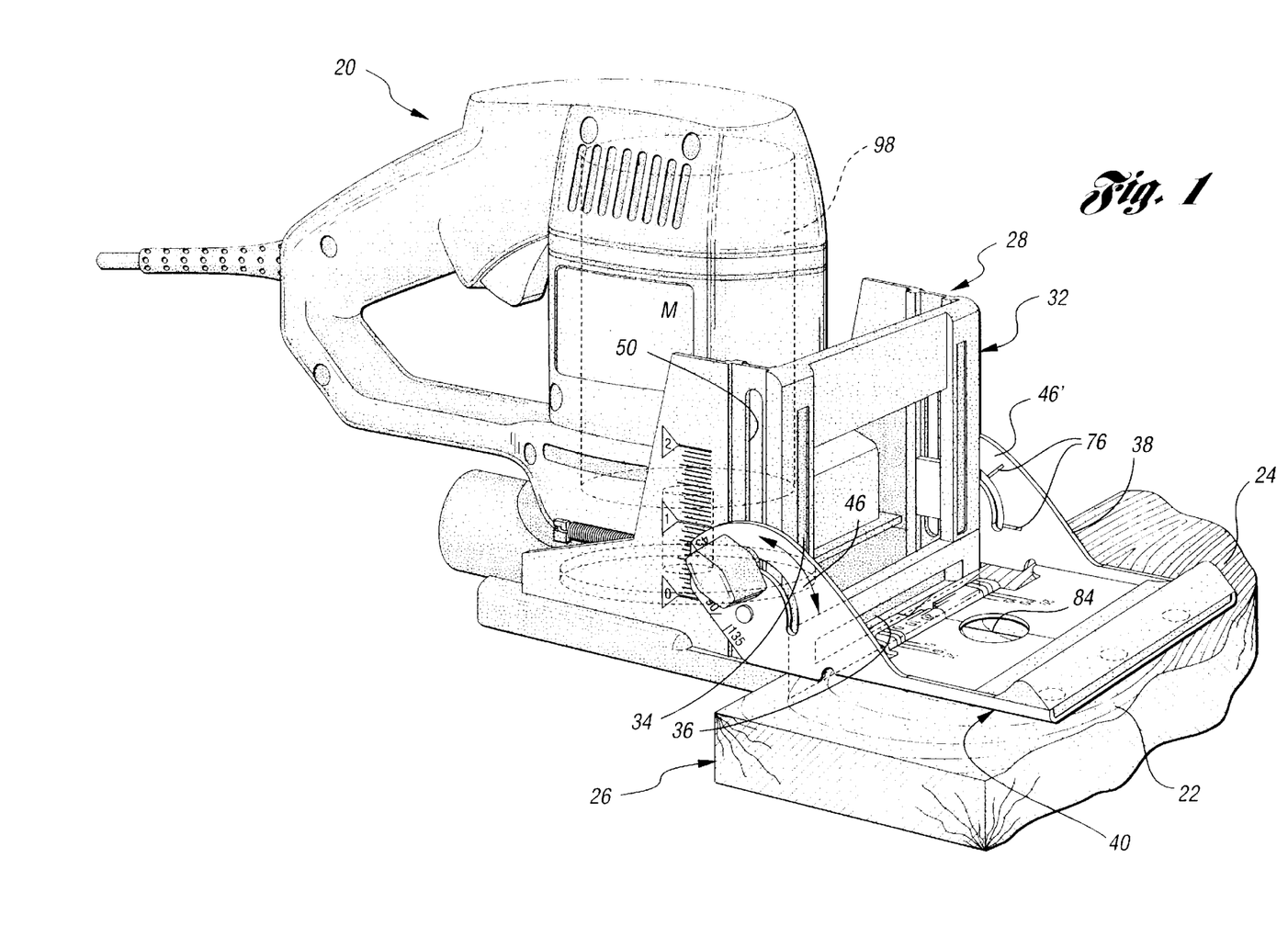
FIG. 1 is a perspective view of a first embodiment of the invention positioned adjacent the workpiece.

A first embodiment according to the present invention is illustrated with respect to FIGS. 1–4. Biscuit cutter 20 is illustrated in FIG. 1, positioned adjacent to a workpiece 22 which is a typical board having a planar surface 24 and an edge surface 26 into which an arcuate slot is to be formed. A second embodiment of biscuit cutter (identified as element 130 herein) according to the present invention is shown and discussed herein in association with FIGS. 5–10.

Biscuit cutter 20 has two main sub-components, namely fence assembly 28 and motor cutter blade assembly 30. Fence assembly 28 engages the workpiece planar surface 24 and edge surface 26 in order to precisely locate the motor cutter blade assembly 30 relative to workpiece 22. Fence assembly 28 is made up of two main components: a base 32 having a planar first fence surface 34 with an elongated opening 36 extending therethrough. The elongated opening 36 abuts the edge surface 26 of workpiece 22 which is to be slotted. The elongated opening 36 is typically in the shape of an elongated slot.

The first fence surface 34 of base 32 is designed to abut in a co-planar relation edge surface 26 of workpiece 22. Base 32 is further provided with an adjustable fence 38 which is affixable to base 32 in various orientations and positions. Adjustable fence 38 is provided with a planar second fence surface 40 for cooperation with and for engaging planar surface 24 of workpiece 22.

Figure 2:
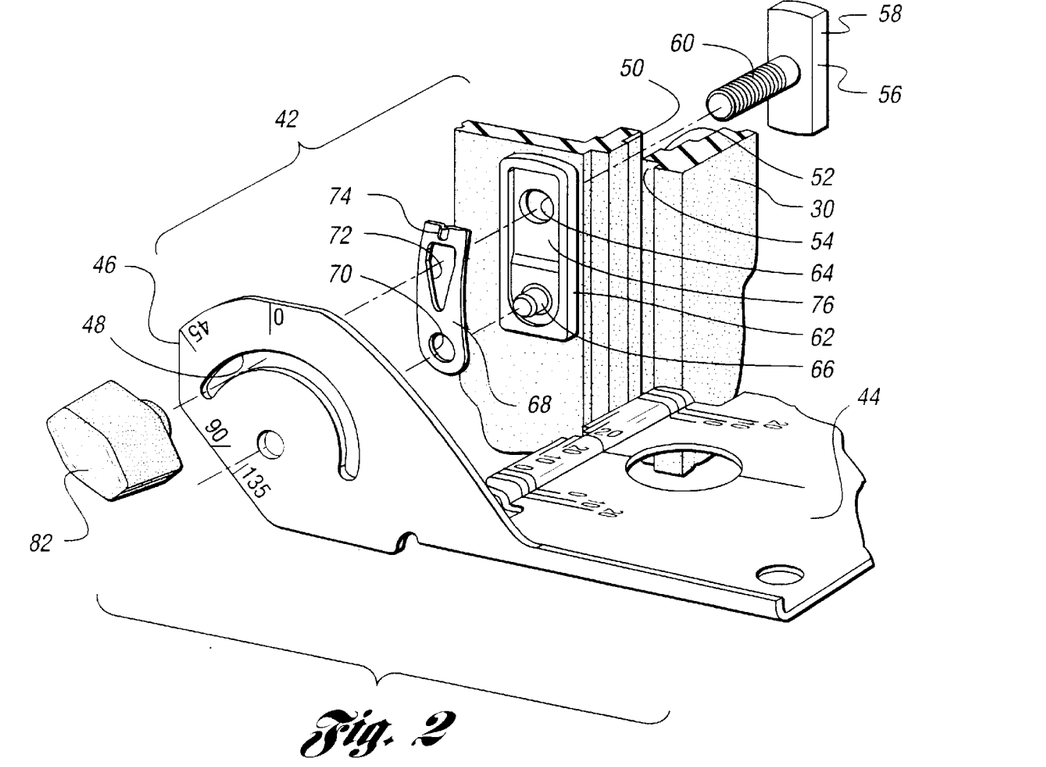
FIG. 2 is a exploded fragmentary view illustrating the fence adjustment mechanism of the biscuit cutter of FIG. 1.

As illustrated in FIG. 2, adjustable fence 38 is affixable to base 32 by way of adjustment mechanism assembly 42. This adjustment mechanism assembly 42 enables a user of biscuit cutter 20 to vary the height of the adjustable fence 38 relative to elongated opening 36 and to vary the angle of second fence surface 40 relative to first fence surface 34. Adjustment mechanism assembly 42 enables the user to pivot adjustable fence 38 through a 135° range—from 45° downward to 90° upward, i.e. co-planar with first fence surface 34.

The adjustable fence 38 is provided with a generally planar center section 44 and a pair of vertical flanges 46 and 46'. Since vertical flanges 46 and 46' are a mirror image of one another, a single side is illustrated in FIG. 2 and described herein. Flange 46 is provided with an curved slot 48. Base 32 is provided with a vertical elongated opening 50, shown as a slot, and a pair of elongated open channels 52 and 54 formed on opposite sides of base 32 adjacent slot 50. Further provided is T-bolt 56 which has a rectangular head 58 sized to slide within channel 52 and an elongated threaded shaft 60 sized to fit through slot 50 of base 32.

A pivot block 62 fits within channel 54 on the opposite side of base 32 from the head 58 of T-bolt 56. Pivot block 62 is rectangular and sized to slide within channel 54. Pivot block 62 also includes an aperture 64 through which threaded shaft 60 of T-bolt 56 passes. Pivot block 62 is further provided with a pivot pin 66 which is spaced from aperture 64 and extends outward parallel to threaded shaft 60.

A spring clip 68 is interposed between pivot block 62 and flange 46. Spring clip 68 is provided with a lower aperture 70 sized to correspond to and receive pivot pin 66. Spring clip 68 further has a second upper aperture 72 through which threaded shaft 60 passes. Spring clip 68 is further provided with a projection 74 sized to fit within one of a plurality of detentes 76 (shown more fully in FIG. 1). Detentes 76 enable the user to conveniently position the fence 38 at a number of selected predetermined orientations, typically 0°, 45°, 90° and 135°.

In a preferred embodiment, the outer rectangular periphery of spring clip 68 is sized to fit within a shallow recessed rectangular pocket 78 in pivot block 62. Flange 46 is provided with an aperture 80 which pivotally cooperates with pivot pin 66 enabling the adjustable fence 38 to be pivoted about an axis extending through the pair of pivot pins 66 associated with flange 46 and 46'. Curved slot 48 of fence 46 then receives the threaded shaft, allowing it to project through the side of flange 46 opposite spring clip 68 in preparation for tightening fence 38 in conjunction with knob 82.

The adjustable fence 38 can be raised and lowered as the pivot block 62 and rectangular head 58 slide up and down in channels 54 and 52, respectively. Once the adjustable fence 38 is properly positioned, knob 82, which threadingly cooperates with threaded shaft 60, is tightened on the opposite side of flange 46 from pivot block 62. This tightening of knob 82 thereby causes the entire fence adjustment mechanism assembly 42 to lock adjustable fence 38 relative to base 32.

With the adjustable fence 38 positioned at the appropriate height and angle relative to base 32, the user must next properly position the biscuit cutter 20 at the appropriate location on workpiece 22. As is typically the case, the user will place a center line mark 84 on the workpiece 22 at the intended center line of the slot to be cut in the workpiece edge 26. As clearly shown in FIG. 3, planar center section 44 of adjustable fence 38 is provided with a center line indicia 86 formed thereon. Planar center section 44 is further provided with a viewing hole 88 so that the user can align center line mark 84 on the workpiece 22 with center line indicia 86 on the adjustable fence planar center section 44.

Figure 3:
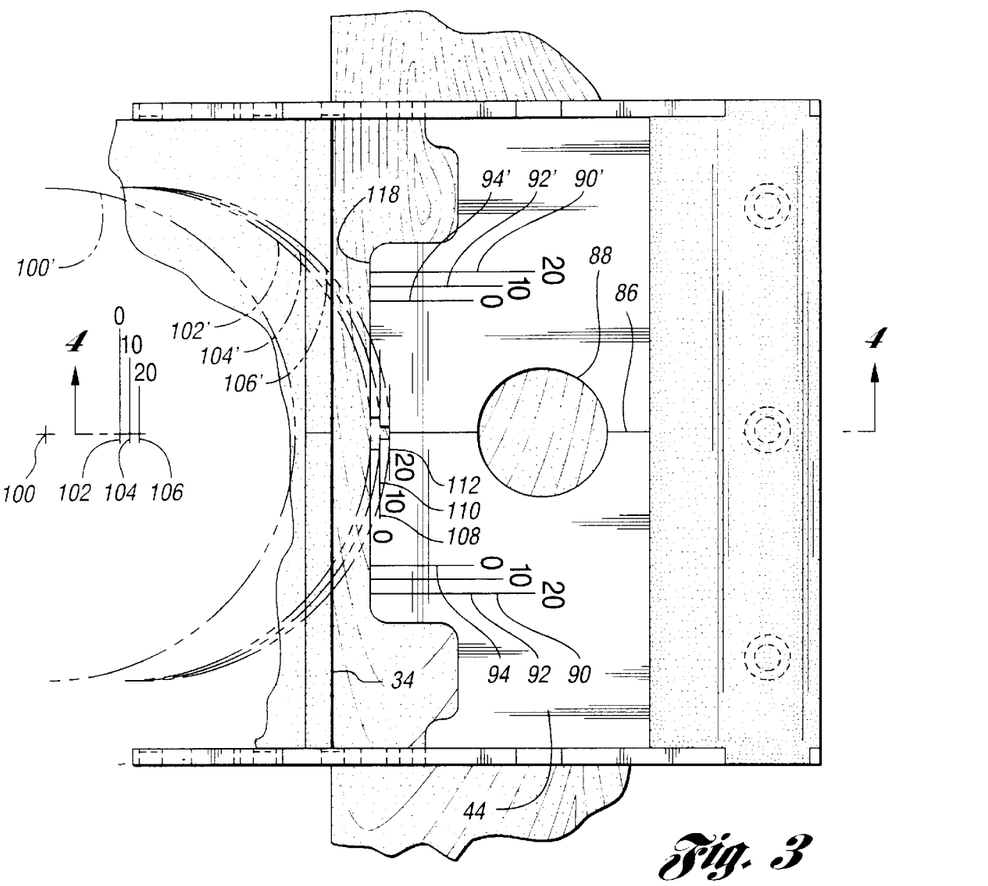
FIG. 3 is a top plan view of the adjustable fence shown in FIG. 1.

The adjustable fence 38 is further provided with a plurality of pairs of slot length indicia 90 and 90'; 92 and 92'; and 94 and 94'. The pairs of slot length indicia are spaced about center line indicia 86 and provide a visual indication to the user, relative to planar surface 24 of workpiece 22, of the length of the slot to be cut or formed for each of a plurality of extended positions of the cutter blade (discussed herein) corresponding to a plurality of different predetermined sized biscuits.

Figure 4:
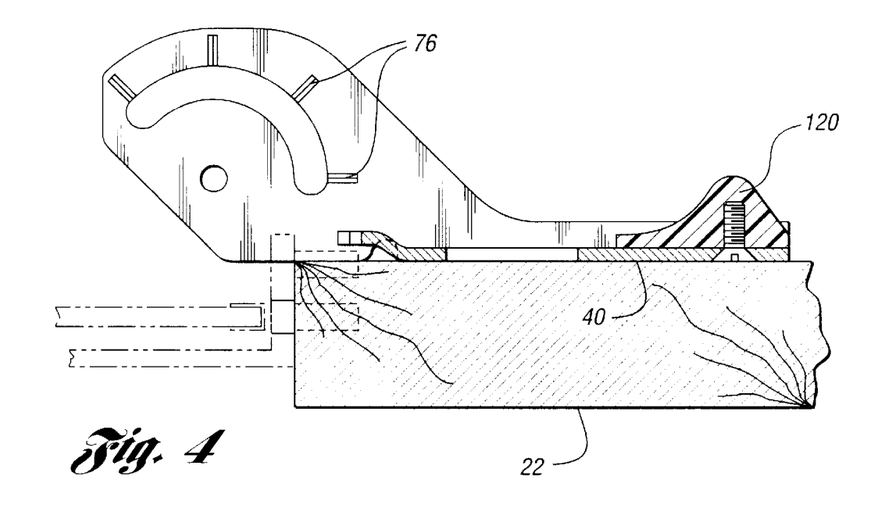
FIG. 4 is a cross-sectional side elevation taken along line 4—4 of FIG. 3.

Biscuit cutter 20 is designed to utilize standard biscuit sizes 0, 10 and 20. Biscuit cutter 20 is provided with a conventional biscuit size adjustment mechanism (discussed in association with FIG. 9 herein) which limits the travel of the rotary cutter blade 96 into the workpiece 22, and particularly into end surface 26 of workpiece 22. When the depth stop is set for size "0" biscuit, as the user advances the motor cutter blade assembly 30 relative to the fence assembly 28, rotary cutter blade 96 projects outwardly through elongated opening 36 as shown in FIGS. 3 and 4. The resulting arcuate slot cut into the workpiece 22 is sized to receive a size "0" biscuit. Rotary cutter blade 96 is rotationally driven by drive motor 98 illustrated in phantom outline in FIG. 1.

As shown in FIG. 3, the rotary cutter blade 96 rotates about a cutter axis (shown in FIG. 3 as element 100 in its retracted position) which is parallel to the first fence surface 34 of base 32. Cutter blade 96 is mounted relative to the base 32 adjacent the elongated opening 36. Cutter blade 96 is shiftable relative the base 32 along a cutter plane which is perpendicular to the first fence surface 34. Specifically, cutter blade 96 is shiftable between a retracted position illustrated in FIG. 4 in which the cutter blade 96 is within the base 32, and a plurality of extended positions in which the cutter blade 96 projects through elongated opening 36 of base 32 into edge surface 26 of workpiece 22. Cutter blade 96 forms an arcuate slot (not shown) in the edge surface 26 of workpiece 22 for receiving a selected one of a plurality of predetermined sized biscuits. The depth and length of the arcuate slot are determined by the depth stop setting which corresponds to one of a plurality of predetermined sized biscuits, namely sizes 0, 10 and 20.

As illustrated in FIG. 3, when the cutter is fully retracted, the cutter axis is located at 100. When the cutter depth stop is set for a size 0 biscuit, the forward most position of the cutter axis is 102. For a size 10 biscuit, the depth stop allows the cutter axis to advance to 104 and for size 20 biscuit, the cutter depth stop allows the cutter axis to advance to 106, as illustrated in FIG. 3. When a cutter axis is located at 100, 102, 104 and 106, the outer periphery of the rotary cutter defines an arcuate path illustrated in FIG. 3 as 100', 102', 104' and 106', respectively.

As is further shown in FIG. 3, the pairs of slots with indicia 90 and 90', 92 and 92', and 94 and 94', provide a visual indication to the user immediately adjacent the edge of the workpiece 22 as to the size of the resulting slot to be cut. This design feature minimizes the likelihood that the user will inadvertently cut a slot which breaks out into the side edge of the workpiece 22 causing a visible defect or resulting in a scrap part.

As is further shown in FIG. 3, adjustable fence 38 is further provided with slot depth indicia 108, 110 and 112 at a location spaced from the fence 38. The slot depth indicia provide a visual indication to the user of the depth of the arcuate slot to be formed in the workpiece 22 at each of the plurality of extended positions of cutter blade 96 for a size 0, size 10 and size 20 biscuit, respectively. The planar center section 44 of the adjustable fence 36 is further provided with a pair of depth notches, 114 and 116, formed in the planar center section 44 to further provide a visual indication of arcuate slot depth. Notch 114 corresponds to a size 10 slot and notch 116 corresponds to a size 20 slot. The front edge 118 of planar center section 44 is located at the depth of a size 0 slot, thereby providing ample clearance between planar center section 44 and first fence surface 34 to enable the user to view the workpiece planar surface 24 and the associated center line mark 84.

As illustrated in FIG. 4, preferably the front edge 118 of planar center section 44 is raised slightly above second fence surface 40 to enable the adjustable fence 38 to be lowered to the point where second fence surface 40 is below the upper surface of the rotary cutter blade 96 as shown in phantom outline, which enable users to cut arcuate shaped hinge pockets.

Adjustable fence 38 in this first embodiment is preferably made of a steel stamping with a plastic handle 120 affixed to the rear edge thereof. A steel stamping is very strong, durable and will last for a great number of years under very rugged use. It is also possible, however, to make fence 38 out of plastic, if the plastic material and conventional thicknesses are selected to provide sufficient strength. If plastic is utilized, ideally a transparent plastic material will be selected to further provide enhanced visibility of the workpiece to the user.

Figure 5:
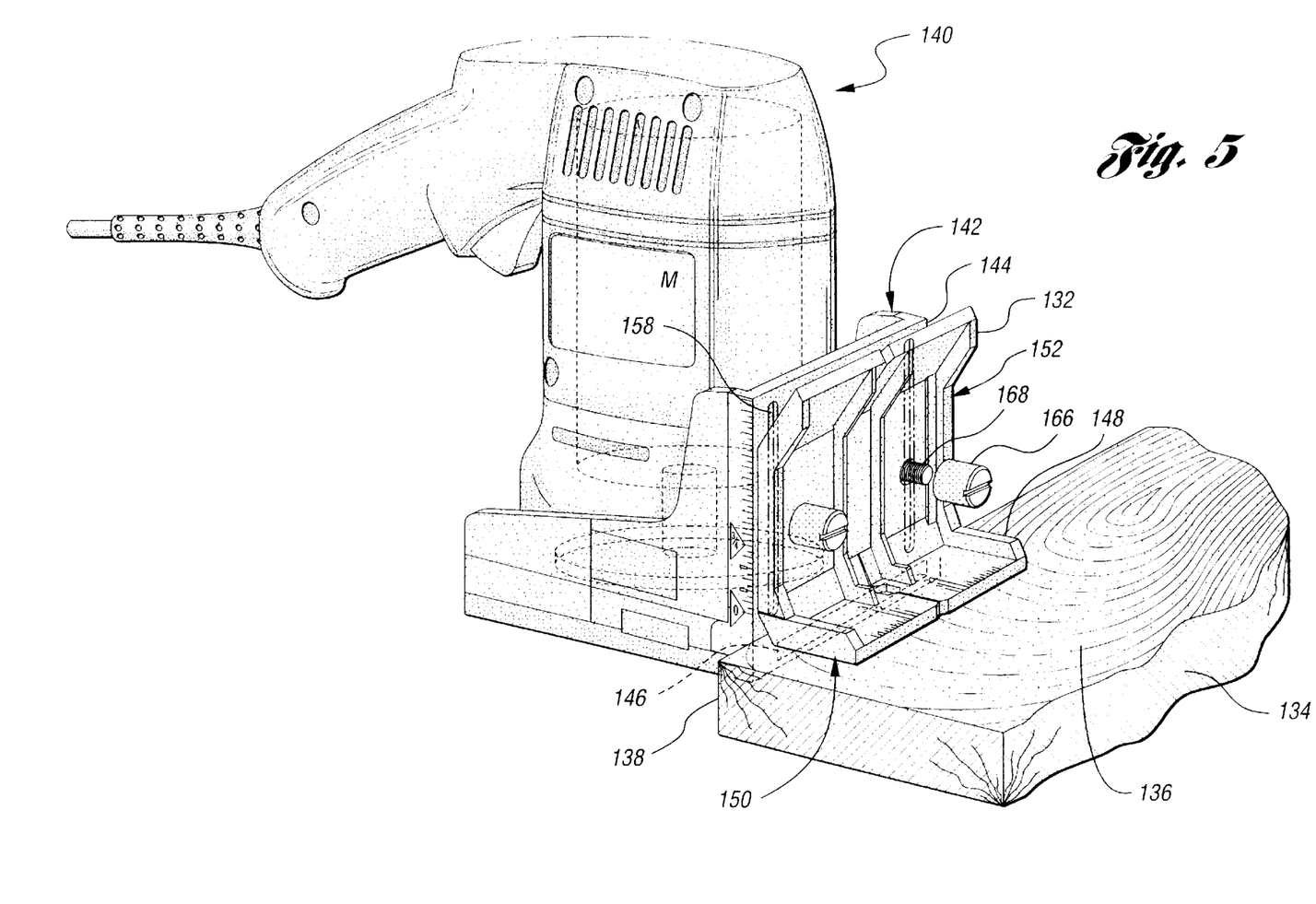
FIG. 5 is a perspective view of a second biscuit cutter embodiment.

A second embodiment of the invention is discussed herein with reference to FIGS. 5–10. As shown in FIG. 5, biscuit cutter 130 is provided with a fence assembly 132 positioned adjacent workpiece 134 having a planar surface 136 and a generally planar edge surface 138. Biscuit cutter 130 is provided with a motor cutter blade assembly 140 which is shiftable relative to base 142. Base 142 is provided with a first fence surface 144 and an elongated opening 146. Adjustable fence 148 is affixable to base 142 at a plurality of positions enabling the height of second fence surface 150 to be varied relative to elongated opening 146.

Figure 6:
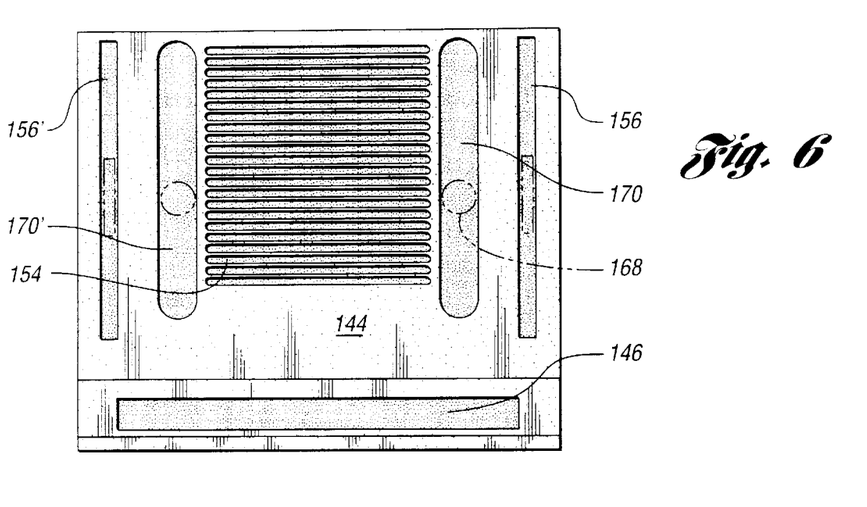
FIG. 6 is a front view of the base of the second biscuit cutter embodiment.

An adjustment mechanism 152 is provided to locate the adjustable fence 148. Second fence surface 150 is positionable at a plurality of predetermined height orientations spaced parallel to elongated opening 146. As illustrated in FIG. 6, base 142 is provided with a series of parallel spaced apart grooves 154 lying in the plane of the second fence surface 150. Grooves 154 are oriented above and are parallel to elongated opening 146. The base 142 is further provided with a pair of spaced apart slots 156, 156' on opposite sides of the elongated opening 146 extending into the first fence surface 144 aligned perpendicular to grooves 154.

Figure 7:
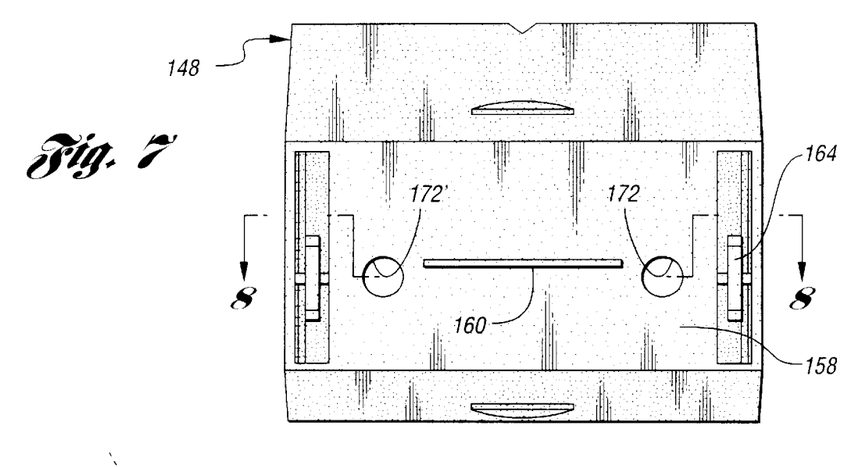
FIG. 7 is a front view of the adjustable fence of the second biscuit cutter embodiment.

As shown in FIG. 7, adjustable fence 148 is provided with a planar engagement surface 158 for cooperating with first fence surface 144 and base 142. Engagement surface 158 is further provided with a raised horizontal rib 160 sized to selectively engage a pair of adjacent grooves 154 of base 142. In a preferred embodiment, grooves 154 are spaced apart 1/16". However, a biscuit cutter intended for a metric-system market would have grooves 154 placed 1 mm apart. Adjustment fence 148 is further provided with a pair of spaced apart tabs 164 and 164' sized to cooperate with slots 156 and 156' to aid in locating the adjustable fence 148 relative thereto. Adjustable fence 148, when properly positioned, is clamped to base 142 utilizing a pair of nut and bolt threaded fasteners 166, 168 and 166', 168', respectively. Bolts 168, 168' project through appropriately sized slots 170 and 170' in base 142 and apertures 172 and 172' in the adjustable fence 148, whereupon nuts 166, 166' are threaded on their respective bolt 168, 168' in order to secure fence 148.

Figure 8:
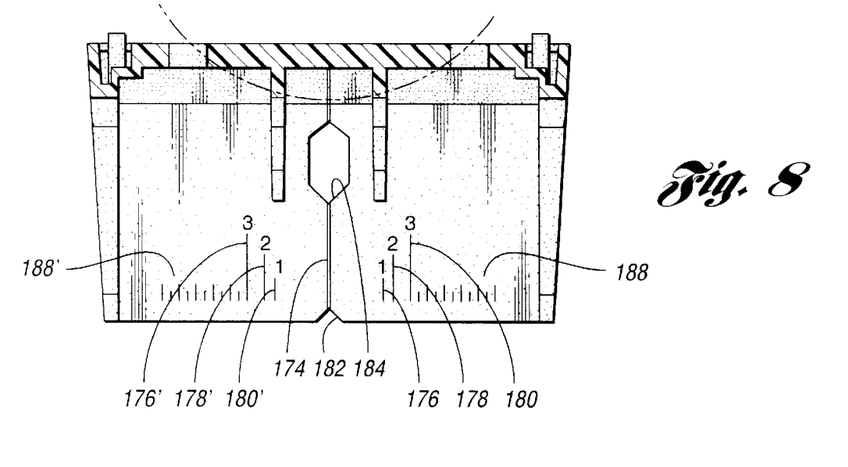
FIG. 8 is a cross-sectional plan view taken along line 8—8 of FIG. 7.

Adjustable fence 148 is formed of a clear or transparent plastic material such as polycarbonate. The clear nature of the adjustable fence 148 enables the user to view the workpiece 134 through the fence 148 to facilitate alignment of the biscuit cutter 130 relative to a center line mark (not shown) on the workpiece 134. This will allow the user to properly align the biscuit cutter 130 in order to from an arcuate slot in the workpiece 134. As illustrated in FIG. 8, adjustable fence 148 is provided with center line indicia 174 and a plurality of pairs of slot length indicia 176 and 176', 178 and 178', and 180 and 180', as utilized in adjustable fence 38 in the first embodiment previously discussed.

Figure 10:
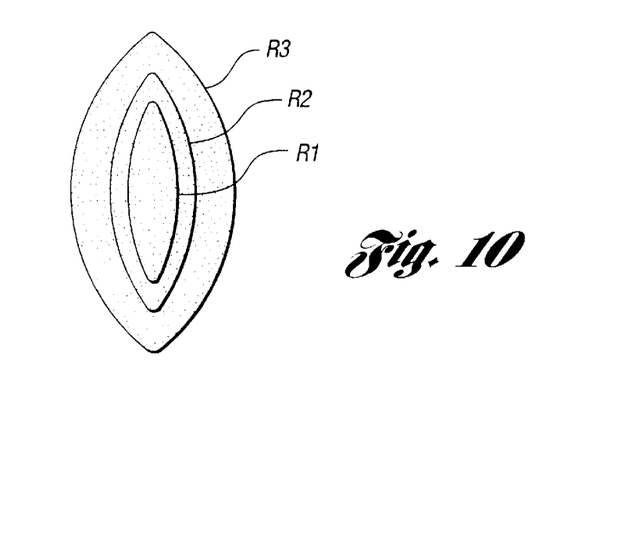
FIG. 10 is a schematic illustration of three "R" series biscuit sizes R1, R2 and R3 which can be installed when using the biscuit cutter according to the second embodiment of the present invention.

Biscuit cutter 130 is designed to use a new series of small "R" series biscuits corresponding to a smaller diameter cutter. Other than using a conventional 4" diameter cutter as in biscuit cutter 20 of the first embodiment, biscuit cutter 130 utilizes a cutter having a diameter of 1½". The three "R" series biscuit sizes are R1, R2 and R3 as illustrated in FIG. 10. Accordingly, the slot length indicia correspond to the length of the slot to be formed with the cutter depth stop set at each of the three slot depth positions.

Figure 9:
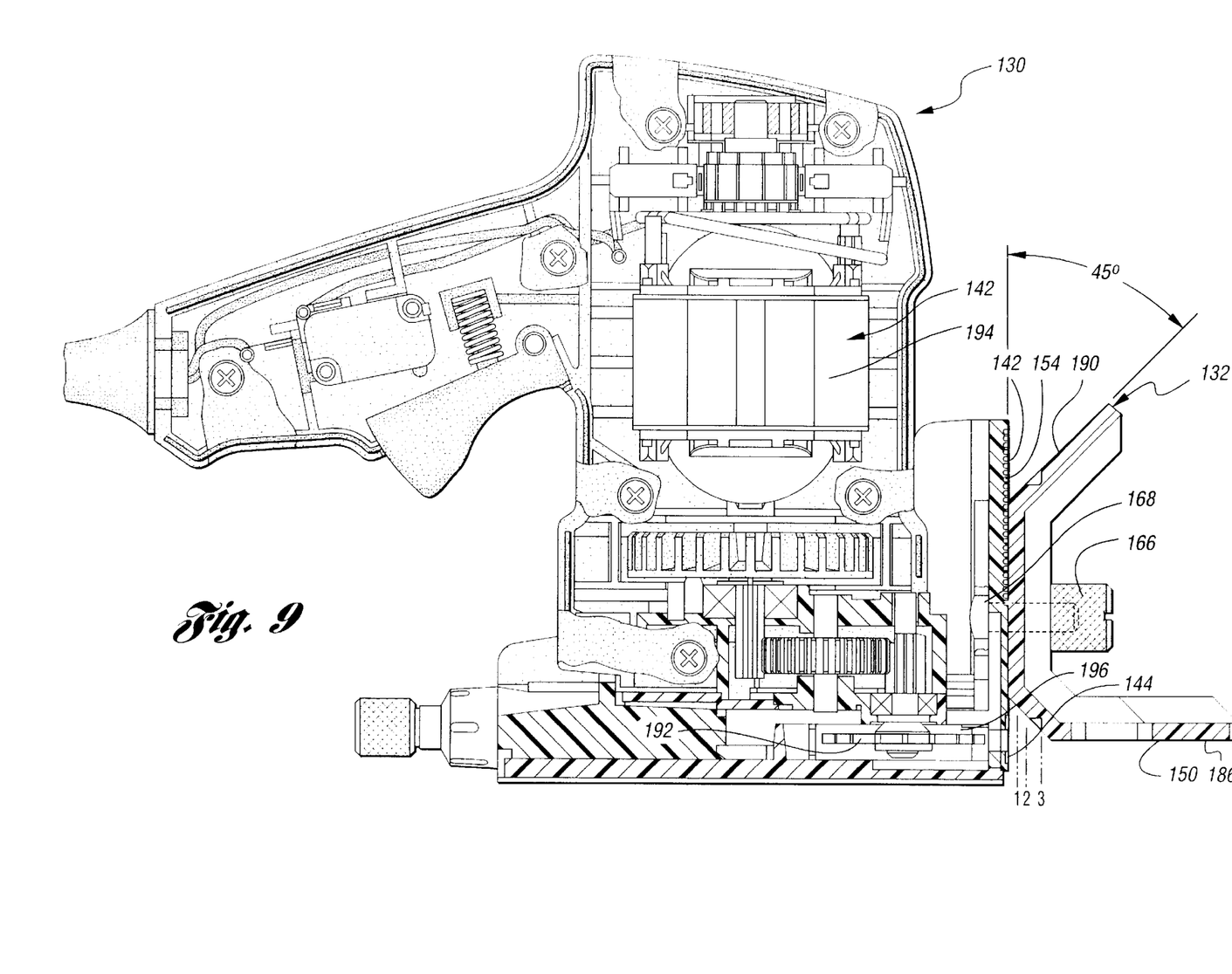
FIG. 9 is a cross-sectional side elevational view of the biscuit cutter according to the second embodiment of the present invention.

As is further shown in FIG. 8, fence 148 is also provided with an alignment notch 182 and an aperture hole 184 oriented along the center line indicia 174. The planar second fence surface 152, illustrated in FIG. 9, is stepped slightly in the region 186 of the indicia so that the indicia can be hot-stamped in ink on the transparent plastic without wearing off in normal use. Referring again to FIG. 8, the fence 148 is further provided with a longitudinal scale indicia 188 and 188', on outward sides of the slot length indicia to facilitate the user in aligning the biscuit cutter 130 relative to the end of a workpiece 134.

Adjustable fence 148 is not adjustable along a wide range of angles as is fence 38 of the first embodiment previously discussed. Rather, fence 148 is positionable at a discreet number of height steps and is provided with a second fence surface 150 which is perpendicular to the first fence surface 144 and an alternative fence surface 190 oriented 45° relative to first fence surface 144. An alternate fence surface 190 can be utilized by removing the adjustable fence 148 from the base by taking off nuts 166 and 166', inverting the adjustable fence 148 so that the alternate fence surface 190 is adjacent the cutter blade 192 and reinstalling the fastener nuts 166 and 166'. Since the alternate fence surface 190 is used relatively infrequently, it may be desirable to omit the printed indicia markings from the alternative fence surface 190 so that these markings do not obstruct the user's view when utilizing the fence in the normal 90° orientation shown in FIGS. 5 and 9.

FIG. 9 is a side cross-sectional plan view of the biscuit cutter 130 according to the second embodiment. In addition to the fence assembly, illustrated therein is the drive motor 194. Motor 194 drives the two-stage gear reduction drive train 196 which in turn operates the cutter blade 192. The biscuit size adjustment mechanism 198, as previously discussed in association with the first embodiment, allows the size of the slot depth to be adjusted. In this embodiment, the slot depth may be adjusted in order to receive the different "R" series biscuit sizes.

It should be understood, of course, that while the invention herein shown and described constitutes a preferred embodiment of the invention, it is not intended to illustrate all possible variations thereof. Alternative structures may be created by one of ordinary skill in the art without departing from the spirit and scope of the invention described in the following claims.

What is claimed is:

1. A biscuit cutter for forming an arcuate slot in an edge surface of a workpiece having a planar surface, the biscuit cutter comprising:

a base having a planar first fence surface with an elongated opening extending therethrough for abutting the edge surface of the workpiece to be slotted;

a drive motor;

a rotary cutter blade driven by the drive motor about a cutter axis parallel to the first fence surface of the base, the cutter blade mounted relative to the base adjacent the elongated opening and shiftable relative the base along a cutter plane perpendicular to the first fence surface between a retracted position wherein the rotary cutter blade is within the base and a plurality of extended positions where the rotary cutter blade projects through the elongated opening in the base into the edge surface of the workpiece to form an arcuate slot for receiving a selected one of a plurality of predetermined sized biscuits; and an adjustable fence affixable to the base in various positions, the adjustable fence having a planar second fence surface for engaging the workpiece planar surface, the adjustable fence having centerline indicia formed thereon for alignment with a slot centerline mark placed on the workpiece planar surface, and a plurality of pairs of slot length indicia spaced about the centerline indicia for providing a visual indication to the user of the length of the slot to be formed at each of the plurality of extended positions of the cutter blade corresponding to a plurality of different biscuit sizes, relative to the planar surface of the workpiece adjacent the edge surface.

2. A biscuit cutter of claim 1 wherein the adjustable fence is provided with a plurality of slot depth indicia formed on the adjustable fence at a location spaced from the first fence surface to provide a visual indication to the user of the depth of the slot to be formed at each of the plurality of extended positions of the cutter blade corresponding to a plurality of different biscuit sizes.

3. The biscuit cutter of claim 1 wherein the adjustable fence is formed of a transparent material enabling the user to view the workpiece through the adjustable fence to further aid the user in properly aligning the biscuit cutter to form an arcuate slot in the workpiece.

4. The biscuit cutter of claim 1 wherein the adjustable fence further comprises an adjustable depth stop which limits the travel of the cutter blade into the edge surface of the workpiece, wherein the adjustable depth stop is movably positioned to a series of settings corresponding to predetermined biscuit sizes $R_1$, $R_2$, and $R_3$.

5. The biscuit cutter of claim 1 wherein the rotary cutter blade is about 1.50 inches in diameter.

6. A biscuit cutter for forming an arcuate slot in an edge surface of a workpiece having a planar surface, the biscuit cutter comprising:

a base having a planar first fence surface with an elongated opening extending therethrough for abutting the edge surface of the workpiece to be slotted;

a drive motor;

a rotary cutter blade having a diameter of about 1.50 inches, the cutter blade driven by the drive motor about a cutter axis parallel to the first fence surface of the base, the cutter blade mounted relative to the base adjacent the elongated opening and shiftable relative the base along a cutter plane perpendicular to the first fence surface between a retracted position wherein the rotary cutter blade is within the base and a plurality of extended positions where the rotary cutter blade projects through the elongated opening in the base into the edge surface of the workpiece to form an arcuate slot for receiving a selected one of a plurality of predetermined size biscuits;

an adjustable fence affixable to the base in various positions, the adjustable fence having a planar second fence surface for engaging the workpiece planar surface; and an adjustable depth stop affixed to the adjustable fence which limits the travel of the cutter blade into the edge surface of the workpiece, wherein the adjustable depth stop is movably positioned to a series of settings corresponding to the predetermined biscuit sizes $R_1$, $R_2$, and $R_3$.

7. The biscuit cutter of claim 6 wherein the adjustable fence further comprises:

center line indicia formed thereon for alignment with a slot center line mark placed on the workpiece planar surface; and a plurality of pairs of slot length indicia spaced about the center line indicia for providing a visual indication to the user of the length of the slot to be formed at each of the plurality of extended positions of the cutter blade corresponding to a plurality of different biscuit sizes, relative to planar surface of the workpiece adjacent the edge surface.

8. The adjustable fence of claim 7 wherein the fence is provided with a plurality of slot depth indicia formed on the adjustable fence at a location spaced from the first fence surface to provide a visual indication to the user of the depth of the slot to be formed at each of the plurality of extended positions of the cutter blade corresponding to a plurality of different biscuit sizes.

9. The adjustable fence of claim 7 wherein the fence is formed of a transparent material enabling the user to view the workpiece through the adjustable fence to further aid the user in properly aligning the biscuit cutter to form an arcuate slot in the workpiece.

* * * * *